United States Patent [19]

Lindén

[11] Patent Number: 4,871,005
[45] Date of Patent: Oct. 3, 1989

[54] VEHICLE TIRE INTENDED TO BE FITTED WITH SPIKES

[75] Inventor: Unto Lindén, Hämeenlinna, Finland

[73] Assignee: Neste OY, Finland

[21] Appl. No.: 187,535

[22] PCT Filed: Sep. 18, 1987

[86] PCT No.: PCT/FI87/00124
§ 371 Date: Apr. 20, 1988
§ 102(e) Date: Apr. 20, 1988

[87] PCT Pub. No.: WO88/01944
PCT Pub. Date: Mar. 24, 1988

[30] Foreign Application Priority Data
Sep. 19, 1986 [FI] Finland .................................. 863802

[51] Int. Cl.[4] .............................................. B60C 11/14
[52] U.S. Cl. .................................. 152/210; 152/209 A
[58] Field of Search .................... 152/210, 211, 209 R, 152/209 A

[56] References Cited
U.S. PATENT DOCUMENTS
1,128,387 2/1915 Tiefenbacher .
3,934,632 6/1976 Kalpin et al. .................... 152/210

FOREIGN PATENT DOCUMENTS
0202912 11/1984 Japan .

OTHER PUBLICATIONS
Patent Abstracts of Japan, Unexamined Applications, vol. 9, Number 70 (M-367) p. 166, Mar. 30, 1985.
Patent Abstracts of Japan, vol. 9, No. 70, (M-367), Abstract of JP 59-202912, PUPL 11/16/84.

Primary Examiner—Michael W. Ball
Assistant Examiner—Gregory J. Wilber
Attorney, Agent, or Firm—Steinberg & Raskin

[57] ABSTRACT

The tire (10) has asymmetric or inhomogeneous regions (14 g) which are disposed to produce a force component turning the fixed spike, respectively the sleeve-mounted spike (15) so that the fixed spike, respectively the sleeve-mounted spike (15), is arranged at first contact with the road surface (13) to meet the road surface (13) substantially in perpendicular position.

17 Claims, 4 Drawing Sheets

VEHICLE TIRE INTENDED TO BE FITTED WITH SPIKES

BACKGROUND OF THE INVENTION

The present invention concerns a vehicle tire intended to be fitted with spikes.

Increasing traffic load and spike tyres in combination have proven to be a remarkable road attrition factor. In some countries this has even led to prohibition of spike tyres, or at least to considerable restrictions.

In Nordic conditions, the beneficial effect of anti-slip means on the safety and flexibility of traffic has on the other hand been irrefutably demonstrated, and this effect should not be sacrificed; instead, the associated drawbacks should be eliminated. Good results will be achieved by further developing both the road superstructures and the anti-slip tires.

As a pneumatic automobile tyre rolls on an even surface, it is considerably flattened radially, owing to its flexibility, whereby in the contact region longitudinal as well as transverse forces are generated owing to changes of the rolling radius.

The longitudinal forces acting on the spike when the tire is rolling are due to bending of the body structure, to longitudinal slipping and to the stress wave building up in the rubber.

When a spike approaches the point of contact with the road, the tyre body undergoes bending such that the radius of the bent part is significantly smaller than that of equivalent parts of the load-free tyre. This deflects the spike, which has been mounted at right angles against the surface, to assume a vertical position before contact with the road. Owing to the protrusion of the spike point, however, the spike is not turned sufficiently; it meets the road surface in an oblique position. At this stage, the forces due to slipping tendency also being to exert their influence.

Traditionally, the shape of the spike has been symmetric and it has been mounted in a hole, perpendicular against the wear surface of the tire, whereby it meets the road in a slightly oblique position, as described above. The oblique contact of the spike with the road, as well as its being pushed deeper into the tyre in oblique position during the initial part of road contact, cause damage to the rubber and to the spike which impairs the friction properties of the spike, detracts from the durability of the spike and increases its road attrition properties.

SUMMARY OF THE INVENTION

The aim of the invention is to achieve an improvement in currently known vehicle tire designs intended to be fitted with spikes. The more specific aim of the invention is to provide a vehicle tire intended to be fitted with spikes which may be fitted with fixed spikes, respectively with sleeve-mounted spikes, and in which the drawbacks troubling designs of prior art have been avoided.

The aims of the invention are achieved by means of a vehicle tire intended to be fitted with spikes which is mainly characterized in that the tire comprises asymmetric or inhomogeneous regions which have been disposed to produce a force component tending to turn the fixed spike or the sleeve-mounted spike, fitted on the tire in such manner that the fixed spike or the sleeve-mounted spike, is arranged at first contact with the road surface to meet the road surface in a substantially perpendicular position.

Other characteristic features of the vehicle tire of the invention are presented below.

BRIEF DESCRIPTION OF THE DRAWINGS

The invention is described more in detail by referring to certain advantageous embodiments of the invention, presented in the accompanying drawings and to which the invention is not meant to be exclusively confined. In the drawings.

DESCRIPTION OF THE INVENTION

Figure 1:
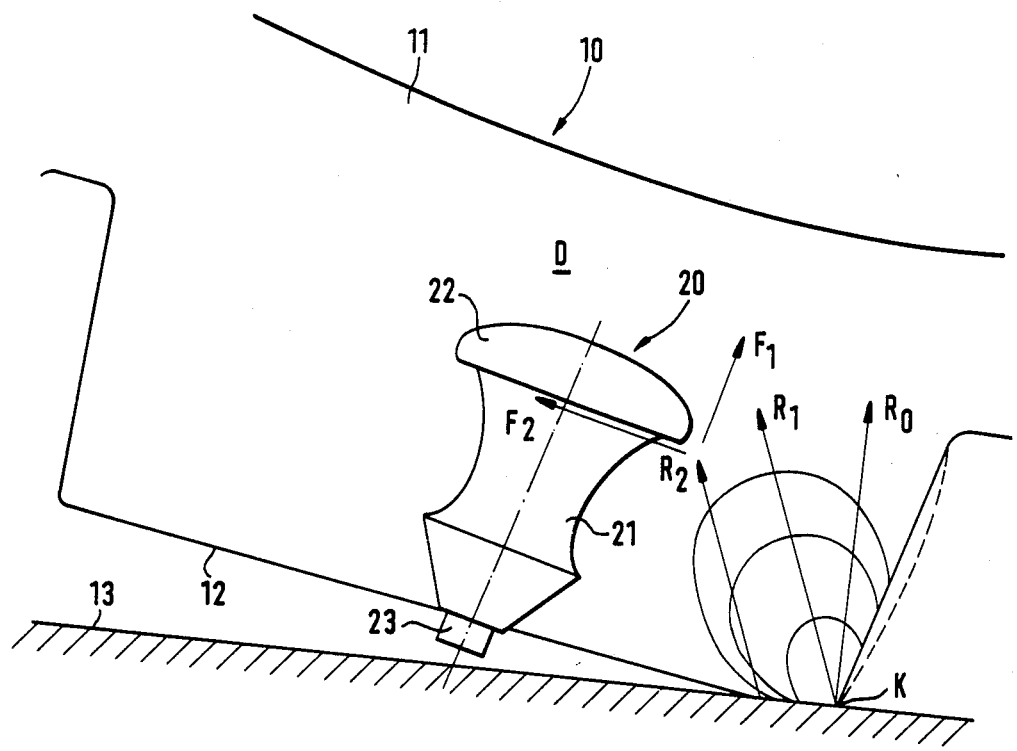
FIG. 1 is schematic illustration presenting the force component turning the spike, the force component lifting the spike and the resultant of the road contact force.

As illustrated in FIG. 1, in a static situation and at low speeds, the pressure effect originating in the contact angle K of the rubber is uniform and its resultant $R_O$ is very close to vertical. The rear margin of the rubber piece 12 bulges out rearwardly and the contact surface, forwardly against the road. As the speed increases, the pressure pattern becomes more pronouncedly oval. The pressure resultant is also turned forwardly because in the region D the pressure in the rubber is lower since no compressive force is present there. Owing to rotation of the tire 10 and compression of the rubber 11, the pressure resultant also moves forward to the point $R_2$ encountering the flange 22 of the spike 20, and imparts to it an upward acceleration, with the component $F_1$, at the same time turning it from the position as installed to a position more nearly perpendicular against the road surface 13, with the component $F_2$. The spike 20 is enabled to turn since there is no compression on the front side thereof. By the mode of installing the spike 20, and by its shape, the utilization of the forces mentioned can be influenced. In FIG. 1, for spike 20 is used a fixed spike 20, its tip being indicated by reference numeral 23.

The rubber 11 of the tyre 10 is asymmetrically shaped. More specifically, the asymmetric shaping of the tyre 10 may be accomplished in accordance with the following FIGS. 2-5 below.

Figure 2:
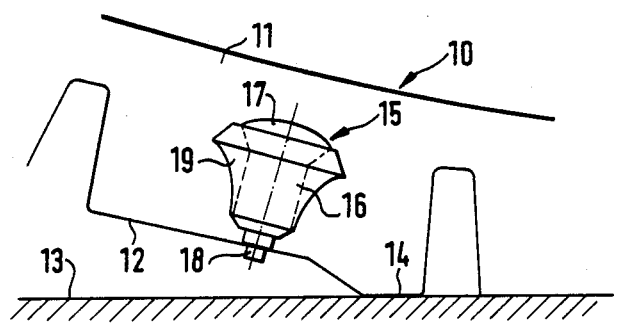
FIG. 2 illustrates an advantageous embodiment of the vehicle tire intended to be fitted with spikes of the invention, in schematic sectional projection.

In the embodiment of FIG. 2, the vehicle tire intended to be fitted with spikes of the invention in general is indicated by reference numeral 10. The tire rubber is indicated by reference numeral 11 and the wear surface, by reference numeral 12. The road surface is indicated by reference numeral 13. In this embodiment a sleeve-mounted spike, in general indicated by reference numeral 15, has been installed in the tire rubber 11. The sleeve-mounted spike 15 comprises the rivet 16, the rivet head 17, the tip 18 and the sleeve 19.

As taught by the basic idea of the invention, in this embodiment eminences 14 have been provided on the wear surface 12 of the tire 10. Only one such eminence 14 has been depicted in FIG. 2, but it is understood that the entire wear surface 12 of the tire is provided with similar eminences 14, the wear surface of every sleeve-mounted spike 15 being similar in kind.

Figure 3A:
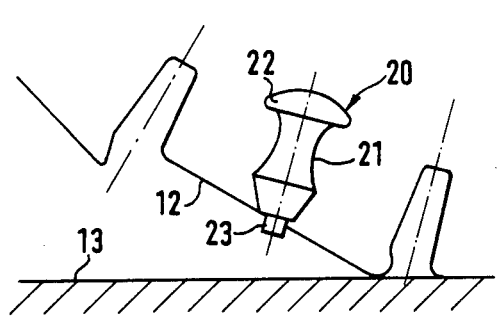
FIGS. 3a and 3b illustrate another advantageous embodiment of the vehicle tyre intended to be fitted with spikes of the invention, in schematic sectional projection and in elevational view respectively.
Figure 3B:
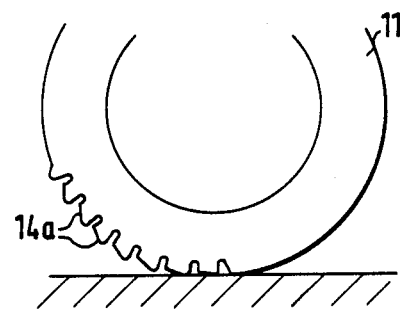

In the embodiment depicted in FIGS. 3a and 3b, the wear surface 12 has been shaped to be an intended pattern element 14a. In this embodiment, fixed spikes 20 are used, comprising a body part 21, a flange 22 and a tip 23. The other reference numerals are equivalent to those in FIG. 2.

Figure 4:
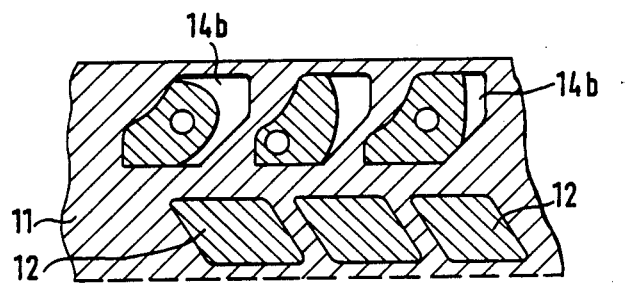
FIG. 4 illustrates a third advantageous embodiment of the vehicle tire intended to be fitted with spikes of the invention, viewed from the direction of the plane of the wear surface.

In the embodiment of FIG. 4, the wear surface 12 is shaped to present knob patterns 14b.

Figure 5:
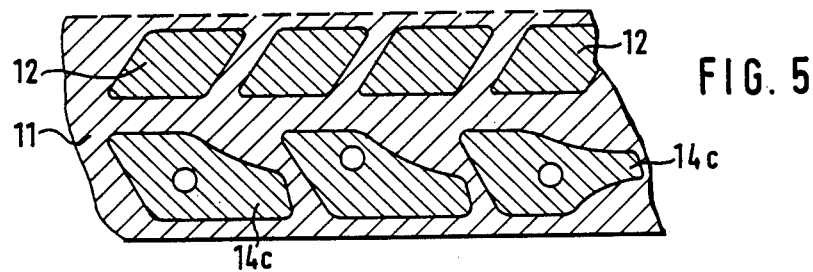
FIG. 5 illustrates a fourth advantageous embodiment of the vehicle tire intended to be fitted with spikes of the invention, viewed from the direction of the plane of the wear surface.

In the embodiment of FIG. 5, the wear surface 12 comprises longitudinal configurations 14c. In other words, the asymmetric shaping may be accomplished by forming on the wear surface 12, tyre-shaped portions 14c running substantially in the longitudinal direction of the wear surface 12.

The properties of the rubber 11 of the tyre 10 may also be changed by treating the rubber 11 of the tyre 10.

Figure 6:
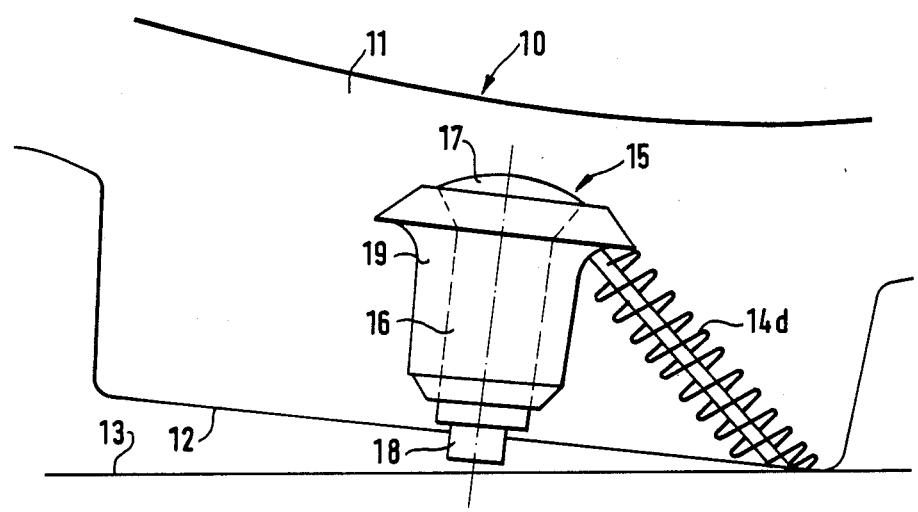
FIG. 6 illustrates a fifth advantageous embodiment of the vehicle tire intended to be fitted with spikes of the invention, in schematic sectional projection.

In the embodiment of FIG. 6, the rubber 11 is hardened in the region indicated by reference numeral 14d, with the aid of heat, radiation, chemicals, etc., so that a region 14d, harder than the rest of the rubber material, leads from the contact angle of the pattern element 12 to the hole of the sleeve-mounted spike 15, or naturally similarly to the hole of a fixed spike 20, and which by mediation of the impact from the road surface 13 delivers, immediately before the moment of road contact, a turning and lifting force component to the sleeve-mounted spike 15 or to the fixed spike 20. In other words, a region 14d harder than the rest of the rubber material of the tyre is produced at the hole for the sleeve-mounted spike 15 or for the fixed spike 20. Said hardening may be accomplished in the manufacturing step of the tire 10 or thereafter, or not until in conjunction with spike installation, e.g. by age-hardening the rubber material 11 with a rotating drill and by injecting curable vulcanizing material into the hole.

Figure 7:
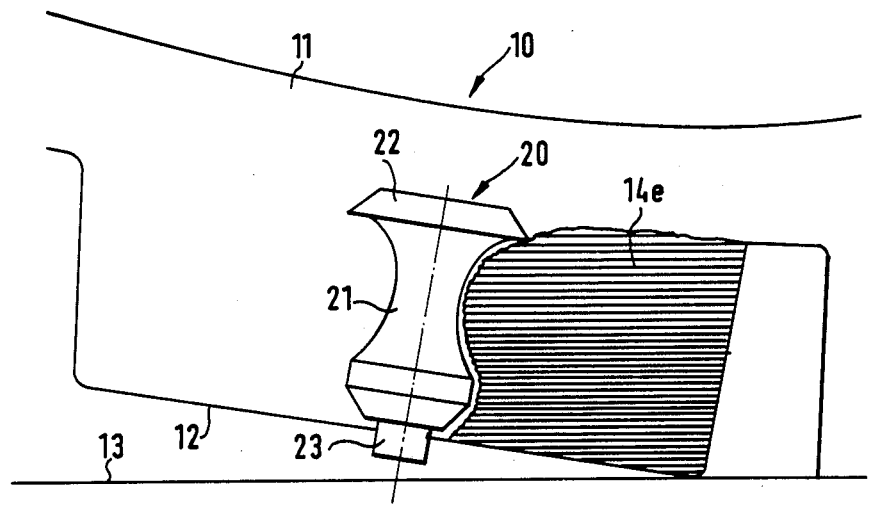
FIG. 7 illustrates a sixth advantageous embodiment of the vehicle tire intended to be fitted with spikes of the invention, in schematic sectional projection.

The embodiment of FIG. 7 is the same as that of FIG. 6 in other respects, except that in the embodiment of FIG. 7 one entire half of the pattern element 12, that is, the region 14e, has been hardened in order to produce a pressure effect, and a fixed spike 20 is used. In other words, half of the wear surface 12 of the tyre 10 which is on one side of the sleeve-mounted spike 15 or the fixed spike 20, has been hardened over the entire region 14e for directing a pressure effect on the sleeve-mounted spike 15 or on the fixed spike 20.

Figure 8:
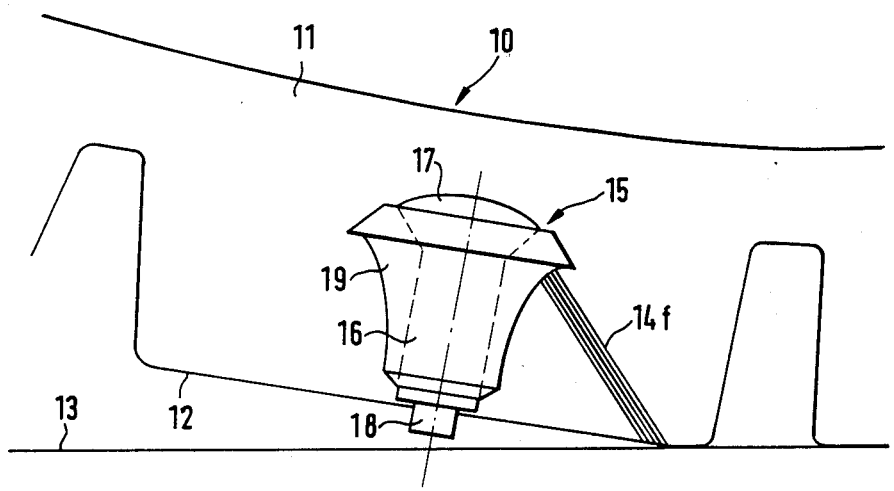
FIG. 8 illustrates a seventh advantageous embodiment of the vehicle tire intended to be fitted with spikes of the invention, in schematic sectional projection

In the embodiment of FIG. 8, the effect which turns and lifts the sleeve-mounted spike 15 is accomplished by placing a piece 14f of some material other than rubber inside the patterned element 12 which is to be fitted with a spike, said piece being arranged to transmit the impact from the contact angle to the sleeve-mounted spike 15. A fixed spike 20 may equally be used instead of the sleeve-mounted spike 15. In the embodiment of FIG. 8, a substantially rod-shaped body 14f e.g. of plastic is inserted in the pattern element 12 which is meant to receive a spike, by cementing or in another way, said body resting with one end against the sleeve 19 of the sleeve-mounted spike 15, or against the flange 22 of the fixed spike 20, or against the rubber region 11 substantially close thereto. The other end of this rod-shaped body 14f is located in the contact angle of the pattern element 12. The deformation of the rubber 11 is transmitted with the aid of the rod-shaped body 14f e.g. to the flange 22 of the fixed spike 20, thus turning the fixed spike 20 to vertical position and also imparting to the fixed spike 20 before road contact an upward acceleration, which reduces the dynamic impact.

Figure 9:
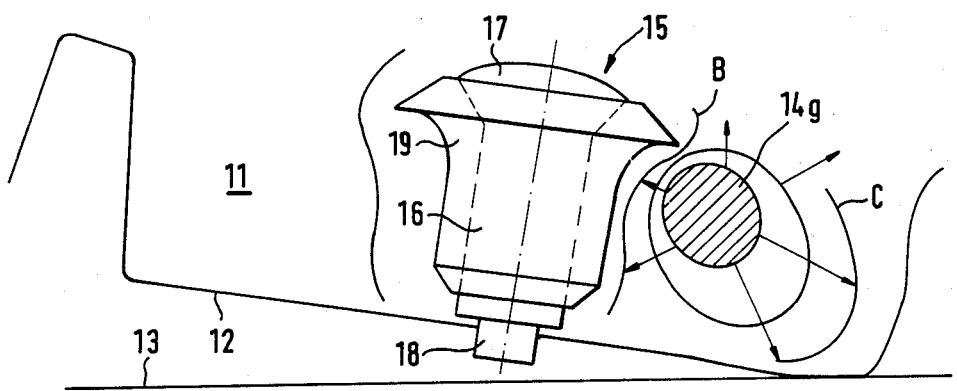
FIG. 9 presents an eigth advantageous embodiment of the vehicle tire intended to be fitted with spikes of the invention, in schematic sectional projection.

In the embodiment of FIG. 9, a body 14g has been installed inside the pattern element 12, which generates around itself in the rubber 11 a stress field, indicated by C. Said stress field C meets the stress field, indicated by B, which was produced at installation of the sleeve-mounted spike 15 or of the fixed spike 20, and turns the fixed spike 20 or the sleeve-mounted spike 15, to a more upright position than that seen in the figure. Such a stress field C also transmits the pressure resultant $R_0$-$R_1$ produced at road contact of the pattern element 12 more rapidly e.g. to the flange 22 of the fixed spike 20, whereby the force component, described above, turning and lifting the fixed spike 20 or the sleeve-mounted spike 15, is produced.

Therefore, as noted above, the present invention is directed to a vehicle tyre intended to be fitted with spikes, characterized in that the tyre 10 has asymmetric or non-homogeneous regions 14, 14a, 14b, 14c, 14d, 14e, 14f, 14g disposed to produce a force component $F_2$ turning the fixed spike 20 or the sleeve-mounted spike 15 installed in the tyre 10, so that the fixed spike 20 or the sleeve-mounted spike 15 is arranged, at initial contact with the road surface 13, to meet the road surface 13 in a substantially perpendicular position. At the same time, the asymmetric or nonhomogeneous region 14, 14a, 14b, 14c, 14d, 14e, 14f, 14g of the tyre 10 is disposed to produce a force component $F_1$ lifting the fixed spike 20 where the sleeve-mounted spike 15, whereby the velocity at which the spike and the road meet, resulting from the rotation of the tyre 10, is simultaneously arranged to be substantially reduced.

In the foregoing merely some of the advantageous embodiments of the invention are presented, and it is clear to a person skilled in the art that numerous modifications thereof can be contemplated within the scope of the inventive concepts set forth above.

I claim:

1. A vehicle tire fitted with at least one spike, said tire comprising at least one asymmetric or non homogeneous region disposed in said tire to generate a force component turning the spike fitted in the tire to meet a road surface in substantially perpendicular position at initial contact with the road surface, upon rotation of said tire.

2. The combination of claim 1, wherein said region is positioned in said tire ahead of a location for receiving the spike, in a rotational direction of said tire.

3. The combination of claim 1, wherein said tire is arranged to be fitted with a plurality of spikes and comprises a plurality of said regions, each said region being situated in said tire to generate said force component turning a respective spike upon the rotation of said tire.

4. The combination of claim 1, wherein said region is provided by material of said tire being asymmetrically-shaped.

5. The combination of claim 1, wherein said region is also positioned in said tire to generate a force component lifting the spike upon the rotation of the tire,
   whereby velocity at which the spike and road surface meet resulting from the rotation of the tire, is substantially reduced.

6. The combination of claim 3, wherein said regions are constituted by eminences being provided on a wear surface of said tyre.

7. The combination of claim 3, wherein said regions are constituted by pattern elements provided on a wear surface of said tire.

8. The combination of claim 3, wherein said regions are constituted by knob configurations on a wear surface of said tire.

9. The combination of claim 3, wherein said regions are constituted by configurations or portions running substantially in a longitudinal direction over a wear surface of said tire.

10. The combination of claim 1, wherein said region is formed by treating tire material at a location of said region.

11. The combination of claim 10, wherein said tire material has been hardened in said region location.

12. The combination of claim 11, wherein said tire material has been hardened by applying at least one of heat, radiation, and chemicals.

13. The combination of claim 11, wherein said hardened region is arranged adjacent to a hole in the tire for receiving the spike.

14. The combination of claim 11, wherein about one-half of a wear surface of said tire of one side on a location for receiving the spike, has been hardened for directing a pressure effect upon the spike when situated at its receiving location and upon said tire rotation.

15. The combination of claim 10, wherein said region is constituted by material different from material forming said tire being situated inside said tire and arranged to transmit impact from said tire with the road surface to the spike when said tire is rotated.

16. The combination of claim 1, wherein said region is constituted by a body arranged in said tire to generate thereabout a stress field in material of said tire and which meets a stress field generated upon installation of the spike within said tire.

17. The combination of claim 1, wherein the at least one spike is arranged in the tire to protrude therefrom.

* * * * *